Dec. 18, 1962     D. W. LEWIS ETAL     3,069,302
INSULATED CONDUCTORS AND PROCESSES FOR PRODUCING THEM
Filed June 13, 1955     2 Sheets-Sheet 1
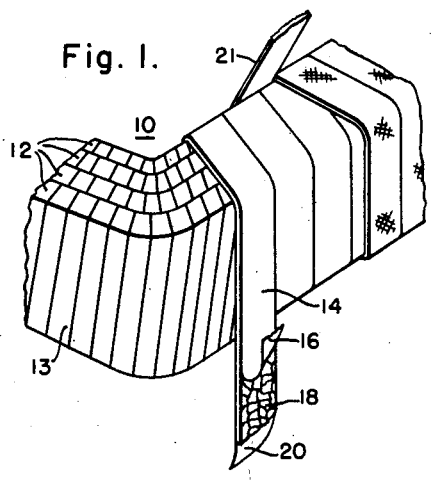
Fig. 1.
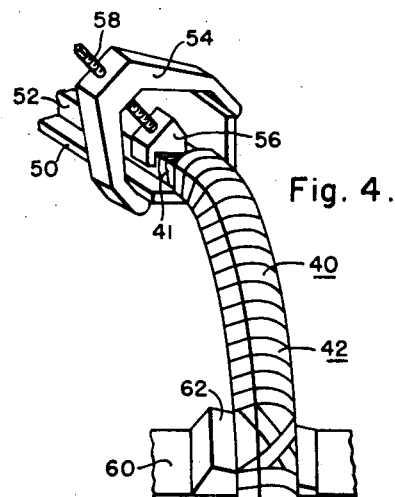
Fig. 4.
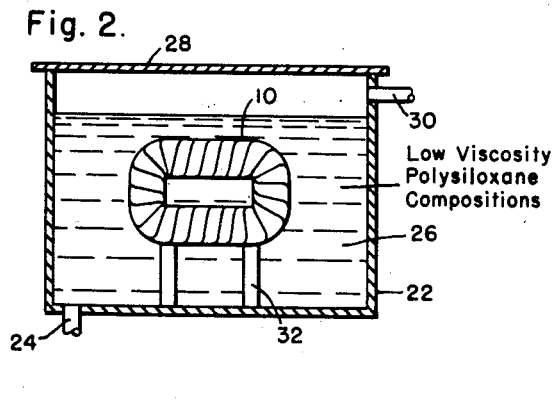
Fig. 2.
Fig. 3.
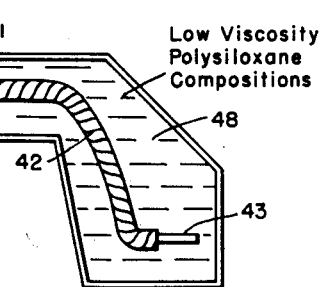
WITNESSES
Robert C. Baird
Leon M. Garman
INVENTOR
Daniel W. Lewis.
HAROLD M. PHILOFSKY
BY Frederick Shapoe
ATTORNEY Dec. 18, 1962  D. W. LEWIS ETAL  3,069,302
INSULATED CONDUCTORS AND PROCESSES FOR PRODUCING THEM
Filed June 13, 1955  2 Sheets-Sheet 2
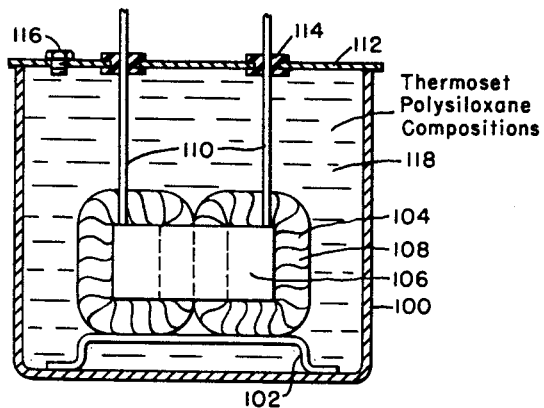
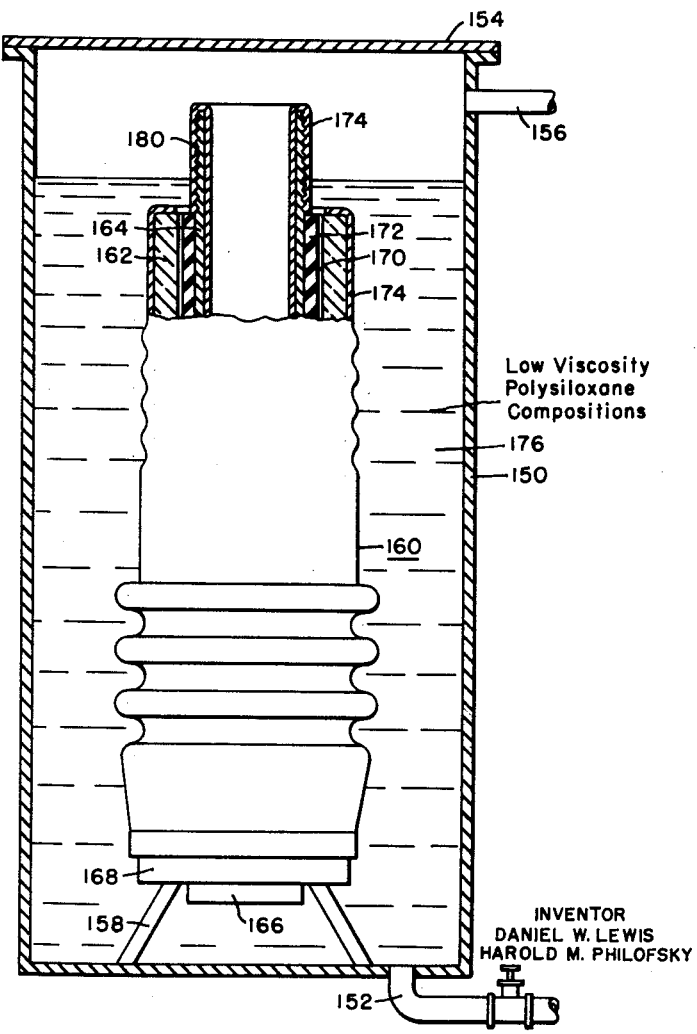
INVENTOR
DANIEL W. LEWIS
HAROLD M. PHILOFSKY

United States Patent Office 3,069,302
Patented Dec. 18, 1962

3,069,302
INSULATED CONDUCTORS AND PROCESSES FOR PRODUCING THEM
Daniel W. Lewis and Harold M. Philofsky, Pittsburgh, Pa., assignors to Westinghouse Electric Corporation, East Pittsburgh, Pa., a corporation of Pennsylvania
Filed June 13, 1955, Ser. No. 514,859
6 Claims. (Cl. 156—53)

This invention relates to insulated electrical conductors embodying thermoset polysiloxane resins and processes for producing them.

While it has been desirable heretofore to apply thermosettable polysiloxane resins to electrical conductors in order to insulate them, there have not been available completely reactive polysiloxane liquid compositions of a suitably low viscosity to enable adequate impregnation of any solid insulating materials applied to the surfaces of the conductors. Completely reactive polysiloxane resins which would not evolve water, gases or other by-products, have not been available, previous to our invention, with a low viscosity of the order of 0.1 to 4 poises, and particularly in the range of less than 40 centipoises, at 25° C.

Previously available completely reactive polysiloxane compositions containing reactive olefinic groups such as >C=C<, have been of a relatively high viscosity, in many cases exceeding 5 poises and often being in excess of 50 poises at 25° C., so that the impregnation of mica tapes, glass tapes, asbestos wrappings and other solid insulation has not been satisfactory for most of the conductor insulating applications in the electrical industry. In many cases, electrical coils are wrapped with 4 to 25 and more layers of mica tape. It requires a composition of an extremely low viscosity to penetrate all of the voids, pores and interstices of such tape to provide a solid and completely impregnated insulation. Polysiloxane compositions of a viscosity in excess of 5 poises at 25° C. will not penetrate five layers of mica tape under vacuum satisfactorily even after prolonged periods of time of a day and more. For practical reasons, it is necessary that the impregnating compositions penetrate through many layers of mica tape or other solid insulation rapidly and preferably in less than one hour's impregnation treatment. Furthermore, the cured solid resinous products prepared from reactive vinyl polysiloxanes usually exhibit progressively inferior physical properties when prepared from liquids of lower viscosities.

As set forth in copending application Serial No. 515,259, now U.S. Patent No. 2,899,403, novel polysiloxane compositions have been discovered which are of extremely low viscosity and capable of completely reacting at moderate temperatures of the order of 100° C. to 200° C. In particular, these compositions comprise polysiloxanes of a low viscosity and of low vapor pressure at temperatures of up to 100° C., and higher, and having the following structural formulation:

(1)
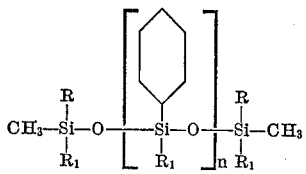

wherein R represents a monovalent radical selected from the group consisting of alkyl radicals having not exceeding four carbon atoms and aryl radicals comprising a benzene ring with not more than two methyl groups substituted for hydrogen, wherein $R_1$ represents a monovalent radical selected from the group consisting of vinyl and methyl radicals, there being at least two vinyl radicals per molecule, and $n$ is at least two. When $n$ has an average value of from 2 to 10, the viscosity is from about 10 to 100 centipoises at 25° C. The most thermally stable and lowest viscosity polysiloxane fluids are obtained when R is either methyl or phenyl in Formulation 1.

The polysiloxane compounds wherein $n$ is 1 in the above Formulation 1 are quite volatile. On heating to 100° C. to 140° C. coils impregnated with polysiloxanes wherein a substantial portion comprises compounds wherein $n$ is 1, copious fumes and vapors of the latter compounds are observed. Compounds wherein $n$ is 2 exhibit a marked decrease in vapor pressure as compared to the compounds wherein $n$ is 1, for instance, they will not boil at 85° C. to 100° C. even at pressures of 0.1 mm. Hg. Consequently, it is preferred to carry out the reactions to produce the minimum of the polysiloxane with $n=1$. If there is present more than a few percent by weight of the polysiloxane with $n=1$, it can be and should be readily separated by fractional distillation. Small quantities of trisiloxane compound, of course, can be present for some uses particularly if two vinyl groups are present per molecule.

Particularly good polysiloxanes are those having the following formulation:

(2)
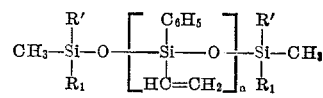

where R' represents a monovalent radical selected from the group consisting of methyl and phenyl radicals and $R_1$ represents a monovalent radical selected from the group consisting of methyl and vinyl radical, there being an average of at least two vinyl radicals per molecule, and $n$ is at least two.

Especially low viscosity fluids comprise the following formulation:

(3)
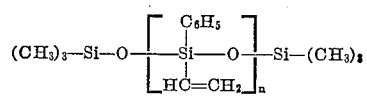

where $n$ is at least two and has an average value of from 2 to 10.

Fluids corresponding to Formula 1 having a viscosity of from approximately 10 to 40 centipoises at 25° C. are obtained when $n$ in the formula has an average value of from 2.0 to 3.5. In Formula 3, when $n$ has an average value of 2.5, the viscosity of the fluid is approximately 15 centistokes at 25° C., and when $n$ has an average value of 3, the viscosity is approximately 20 centistokes at 25° C.

The low viscosity polysiloxane liquids of the present invention, for example those of Formulation 3, may be prepared by hydrolyzing (a) from 2 to 10 mols, or more, of a phenylvinylsilane monomer in which the remaining two groups attached to silicon comprise a readily hydrolyzable radical such as chlorine, fluorine, alkoxy or aryloxy radicals such, for example, as methoxy, ethoxy or phenoxy, or an amine group, in admixture with (b) two mols of an end blocking agent such, for example, as a silane monomer having only one readily hydrolyzable group attached to silicon while the other radicals attached to silicon are selected from the group consisting of methyl, phenyl and vinyl, there being not more than one phenyl or more than one vinyl group on such monomer. The mixture is hydrolyzed with water or an aqueous acid, such as 5% or 20% sulfuric acid. The hydrolyzate is condensed with an acid or an alkali to the polysiloxane. The hydrolysis and condensation may be carried out simultaneously on the mixture. One mole of a disiloxane may be substituted for each two mols of the (b) silane to furnish end blocking groups by cleavage of the disiloxane by an acid condensation catalyst. In such disiloxanes there are six hydrocarbon radicals attached to the two silicon atoms, there being at least one methyl on each of the silicon atoms, and not exceeding one phenyl and one vinyl radical on each of the silicon atoms. Examples of such disiloxanes are hexamethyl disiloxane, and 1 phenyl-1,1-dimethyl-3-phenyl-3,3-dimethyl disiloxane, and 1,3-dimethyl-1,3-diphenyl-1,3-divinyl disiloxane.

For certain applications it is desirable that the liquid polysiloxanes of Formulation 1 be combined with more viscous polysiloxanes having the reactive $>C=C<$ group in order that the combination produce compatible, completely reactive polysiloxane compositions of intermediate viscosity of substantially more than 0.2 poise at 25° C., and preferably of the order of 1 to 4 poises at 25° C., which will cure to solid resinous products having excellent properties and are tough and flexible under conditions of use.

All of these polysiloxane compositions have the highly advantageous property of low volume shrinkage in polymerizing from the liquid state to the solid state. The volume shrinkage of the polysiloxane compositions alone is from about 4% to 5%. This constitutes an unusually desirable characteristic inasmuch as most resins in passing from the liquid state to the thermoset solid state shrink considerably more with resultant disadvantages such as cracking, failure to fill a given space and so forth. By including fillers such as finely divided silica, the shrinkage may be reduced even further. For instance, a composition comprising 50% by volume of the liquid polysiloxane and 50% by volume of 300 mesh silica will have a volume shrinkage of about 2% in curing to a solid body.

The object of this invention is to provide for an insulated electrical conductor embodying solid insulating material and a thermoset polysiloxane resin having excellent physical and electrical properties, substantially completely impregnating the solid filler.

Another object of the invention is to provide an electrical coil insulated with mica flakes and a thermoset completely reactive polysiloxane resin having excellent physical and electrical properties, impregnating the mica flakes.

A still further object of the invention is to provide a process for applying to electrical conductors insulation comprising solid insulating material and a completely reacted polysiloxane resin solidly impregnating the solid insulation.

Other objects of the invention will, in part, be obvious and will, in part, appear hereinafter.

For a better understanding of the nature and objects of the invention, reference should be had to the following detailed description and drawing, in which:

FIGURE 1 is a fragmentary perspective view of the coil wrapped with mica insulation;

FIG. 2 is a vertical section through an impregnating tank;

FIG. 3 is a plan view of a half coil disposed in an impregnating tank;

FIG. 4 is a fragmentary view in elevation of a half coil disposed in a confining die and forming jig;

FIG. 5 is a vertical section through a potted coil assembly; and

FIG. 6 is a vertical section through an impregnating tank for impreganting electrical bushings.

In accordance with the present invention electrical conductors provided with solid insulation such, for example, as mica tape or wrapping, glass tape, asbestos tape and the like, are readily completely impregnated with a completely polymerizable polysiloxane composition of such low viscosity that complete and thorough filling of all of the pores of the insulation is effected, and thereafter the applied polysiloxane composition is cured to a solid void-free insulation.

The present invention is particularly suitable for preparing conductors embodying mica and a completely reactive polysiloxane resin. Mica insulation and, in particular, composite mica tape embodying a layer of mica flakes, a backing and a binder is employed for the highest quality electrical insulation available at the present time. However, a plurality of layers of mica tape or wrapping is particularly difficult to impregnate unless the impregnating compositions are of extremely low viscosity. Thus, if a conductor is wrapped with from 16 to 25 layers of mica tape, it has been the experience that this thickness of mica tape can only be satisfactorily impregnated in a reasonably short period of time, with an impregnant of a viscosity of less than 0.5 poise at 25° C. By applying pressures of up to 40 pounds per square inch to the impregnating polysiloxane, we have been able to impregnate 12 to 16 layers of mica tape with polysiloxane compositions of a viscosity of about 1 poise at 25° C. Conductors wrapped with 4 to 6 layers of mica tape require four to six hours for adequate impregnation with a fluid polysiloxane of a viscosity of 4 poises at 25° C., though we have been able to reduce the impregnaing time to one hour where the fluid polysiloxane composition is subjected to pressures of 40 pounds per square inch gauge. It will be appreciated that impregnating tanks capable of operating at such pressures are quite costly, the operating expense is high and the problems encountered in their use and maintenance are substantial.

In order to successfully impregnate mica insulation applied to electrical conductors, it is necessary that the mica flakes in the form of a composite tape or wrapping be treated with a liquid resinous binder having a viscosity of from 100 to 100,000 poises at 25° C. A further requirement is that the viscous resinous liquid binder comprise a polysiloxane resin which is (1) compatible with the impregnating polysiloxane composition as disclosed herein and (2) has reactive $>C=C<$ groups attached to silicon by carbon-silicon bonds. Composite mica insulation suitable for use in practicing the present invention may be prepared by applying thereto high viscosity liquid compositions embodying $>C=C<$ groups attached to silicon in the following manner. The high viscosity polysiloxane composition is dissolved in an organic solvent such, for example, as toluene, xylene or benzene, to produce a solution comprising from 20% to 50% by weight of the polysiloxane resin. The solution so prepared is then dripped, rolled, or sprayed upon a layer of mica flakes, preferably carried by a sheet backing material, such, for example, as glass fiber cloth. The treated mica flakes on the backing are then subjected to heat in order to evaporate the solvent. The heating, however, is so conducted that the polysiloxane binder is not cured. At this state, the polysiloxane binder while a highly viscous liquid, is present in the mica tape in quantities of the order of from 3% to 20% of the weight of mica tape and the tape does not feel particularly wet and in some cases even appears to be dry. However, on attempting to separate the bonded mica flakes from each other or from the backing, it will be found that they are held quite well to each other and to the backing with a sticky layer of the polysiloxane. In many cases it may be desirable to apply to both faces of the layer of mica flakes a thin sheet of glass or asbestos cloth in order to enable the mica sheet tape or wrapping to be handled and applied to conductors with best results.

The following examples illustrate the making of a mica tape.

*Example I*

There was applied to a sheet of woven glass cloth of a thickness of 1 mil a layer of mica flakes of a thickness of approximately 5 mils. There was then applied by dripping on the layer of mica flakes a 35% solution in toluene of a polysiloxane composition having a viscosity of 5,000 poises at 25° C. This polysiloxane composition was prepared by hydrolyzing a toluene solution of 4 mols of dichlorophenylvinylsilane and 6 mols of dichloromethylphenylsilane with ice water. The toluene solution with this hydrolysate was then refluxed for several hours in the presence of KOH or other strong alkali. The alkali was then neutralized by shaking with dilute hydrochloric acid. The mixture was then sparged with an inert gas (such as nitrogen) and the temperature was increased to and maintained at about 150° to 200° C. until the desired viscosity and tack were reached. A covering sheet of 1 mil thick woven glass cloth was applied to the mica tape and then pressed lightly under rollers to unite the sheets with the mica flakes. The sheet so produced was then subjected to a brief heating at 100° C. to evaporate the toluene. The resulting sheet was found to comprise approximately 12% by weight of the polysiloxane resin. The sheet was then slit into tapes for application to electrical coils.

Other satisfactory mica tapes were also prepared from polysiloxane fluids of a viscosity of 25,000 poises which were prepared as indicated in this Example I.

*Example II*

A polysiloxane liquid was prepared as follows: A mixture of 37.5 parts of diethoxyphenylvinylsilane, 30 parts of diethoxydimethylsilane and 81.2 parts of 1,4-bis-(ethoxydimethylsilyl)benzene was dissolved in about 165 parts of benzene contained in a vessel. The vessel was placed in an ice bath and cooled to 0° C. The solution was hydrolyzed by adding about 100 parts of 80% sulfuric acid while stirring vigorously over a period of about one hour. The solution was removed from the ice bath and stirred for an additional hour, crushed ice being added near the end. The benzene solution containing the condensate was permitted to separate out and the acid-water layer was discarded. Free acid was washed from the benzene solution by treatment with sodium bicarbonate. Water and benzene were then removed by evoporation using heat and vacuum, leaving about 80 parts of a polymerizable intermediate organosiloxane fluid having a viscosity of 6 poises at 25° C. Further treating this oil with concentrated sulfuric acid an oil of higher viscosity is obtainable which can be used directly as a mica bond. The viscosity of this 6 poise oil was increased by dissolving 75 parts thereof in 75 parts of benzene and vigorously agitating the solution with 80% sulfuric acid for an hour. The oil thus obtained had a viscosity of 5400 poises at 25° C.

The polysiloxane composition of this Example II was dissolved in benzene to produce a 30% solution. The solution is applied to a 7 mil thick layer of mica flakes disposed on a backing of 1 mil glass cloth. After covering the treated mica flakes with a top sheet of 1 mil thick woven glass cloth, the assembly was rolled lightly and then heated in an oven to remove the benzene. The resulting mica tape comprises 15% by weight of the polysiloxane composition.

For most applications involving the impregnation of the mica tape, the proportion of the liquid polysiloxane binder in the tape should not exceed 25% of the weight of the mica tape. Good results have been attained with composite mica insulation wherein the polysiloxane composition comprised from 5 to 20% by weight of the mica tape. If a high tape strength is not required, the amount of polysiloxane binder may be as low as 3% of the weight of the mica tape.

In preparing an electrical conductor, the mica tape or mica sheet wrapping is applied to the surface of the electrical conductor in as many thicknesses or plies as is necessary fos the voltage or other requirements of the electrical application. The conductor may comprise a single conductor, or several conductors, and each conductor may comprise a plurality of turns. The conductor may comprise solid bars of copper, silver, brass or other metal or a resistance material such as iron or other alloy. The conductor may comprise hollow tobes of copper or include tobes of German nickel or Phosphor bronze disposed within an outer layer of copper strip. These tubes convey hydrogen or other coolants to the interior of the conductors.

Referring to FIG. 1 of the drawing, there is illustrated a portion of a coil 10 being insulated in accordance with the invention. The coil 10 comprises four turns 12 of a conductor to which there has been applied turn insulation 13. The turn insulation 13 may comprise a mica tape or a glass tape, usually with a resin impregnant such, for example, as an epoxy resin or a thermosettable polysiloxane resin. The turns of the conductors 12 are then wrapped with plies of the mica tape 14 comprising a sheet backing 16, a layer of mica flakes 18 and a covering sheet 20, all united with the viscous polysiloxane composition of a viscosity of from 100 to 100,000 poises at 25° C. As many layers of the mica tape 14 are applied as are required by the application. If necessary or desired, a wrapping of glass tape 21 may be applied over the entire plies of the mica tape wrapping.

The coil 10 with the mica tape wrapping thereon and glass tape overlap, if desired, is then vacuum impregnated in the impregnating tank 22 of FIG. 2. The impregnating tank 22 is provided with a conduit 24 through which polysiloxane composition 26 may be introduced or withdrawn as desired. The tank is provided with a suitable sealing cover 28. At the upper end of the tank is a conduit 30 by means of which the interior may be connected to a source of vacuum such as a vacuum pump or the like, or alternatively to the atmosphere or to a source of gas under pressure such, for example, as nitrogen or carbon dioxide in the event that the impregnating polysiloxane is to be put under pressure to assist in impregnation of the coil 10. The coil 10 is disposed on a support 32 within the tank 22.

It has been found desirable to place the coil 10 on the supports 32 in the empty tank 22 and then apply a vacuum through the conduit 30 in order to remove air, moisture and any other volatiles that may be present within the coil 10. In some cases, the coil may be heated before being put in the tank 22 or while it is therein in order to assist thorough evacuation thereof. Subsequently, the coil 10 is flooded with or immersed in the polysiloxane composition 26 of a viscosity of less than 4 poises at 25° C. and preferably below 50 centipoises. After the polysiloxane 26 has been admitted in an amount sufficient to cover the coil 10, the vacuum may be broken and either atmospheric pressure admitted through the conduit 30, or superatmospheric pressure applied to the surface of the polysiloxane to assist in impregnating the interstices and pores of the mica tape and the spaces between the turns 12 of the coil. With the relatively low viscosity polysiloxane compositions of this invention, the impregnation of the coil 10 is rapidly and completely effected. Ordinarily, in less than an hour, the mica tape wrappings and all the spaces are completely and thoroughly filled and saturated. Thereafter, the tank may be opened and the coil withdrawn for subsequent curing.

The impregnated coil 10 with the composition 26 applied thereto is briefly drained and then may be placed in an oven or within a mold or form which is heated, and the applied polysiloxane composition is fully cured.

In most instances the impregnated coil 10 will be wrapped with an impervious film or sheet immediately after a brief superficial drainage in order to prevent any excess escape from the interior of the mica wrapping or exudation of the impregnating polysiloxane composition. A suitable material for such wrapping comprises tapes of cellulose acetate, polyvinyl alcohol, polytetrafluoroethylene, chloroprene rubber, and polyethylene glycol-terephthalate polymer. Good results have been obtained with one mil thick, 2 inch wide polyethylene glycol terephthalate films applied half lapped. The applied impervious tape minimizes loss of the polysiloxane until full curing thereof. It also helps to confine the mica tape and facilitates removal of the coils from sizing and curing molds.

The polysiloxane composition may be cured to convert it to a solid polymer by heating or irradiating it with actinic or ultra-violet radiation, particularly when the composition has been admixed with a vinyl type polymerization catalyst such, for example, as benzoyl peroxide, lauroyl peroxide, methyl ethyl ketone peroxide, t-butyl hydroperoxide, ascaridole, tert-butyl perbenzoate, di-t-butyl diperphthalate, ozonides, and the like. Such catalysts may be employed in an amount of from 0.1% to 2% by weight, although somewhat larger or smaller amounts may be employed, if desired. Furthermore, polymerization accelerators may be added to such catalysts in an amount of, for example, 0.01% by weight.

The polysiloxanes may be cured, without any added catalyst, by subjecting them to either ultra-violet light or radiation of higher frequency, including gamma rays or electron beam radiation, which latter may be obtained from a Van de Graaff generator, or from a radioactive material such as radioactive cobalt which will apply thereto electrons and gamma rays. Fluid compositions may be subjected to electron beam radiation of at least 0.05 m.e.v. to apply from 2 to 50 megarep. to produce solid polymers therefrom.

The polysiloxane compositions of the present invention have been employed with considerable success in preparing half coils such as are used for high voltage generators in central power stations and the like. In many cases, the half coils carry electrical current at voltages of from 5,000 to 24,000 volts and higher. It is necessary that the insulation employed in such generators be of the highest quality and reliability in order to maintain service to the consumer.

The half coils may be of a length of up to 30 to 40 feet and more. Each half coil ordinarily comprises a plurality of transposed turns of copper strip or rectangular copper wire. The turns are insulated by applying thereto a layer of solid insulating material, for example, glass cloth impregnated with a thermoset polysiloxane varnish or other suitable resin. Thereafter, the half coil is formed to shape in which the central portion, which constitutes a major part of the coil, is relatively straight. Such central portion is designated the slot portion of the half coil and it is placed within the slots in the magnetic core of the stator of the generator. Such a coil is illustrated in FIG. 3 of the drawing wherein the half coil 40 comprises the straight slot portion 41. Beyond each end of the slot portion 41 there extends a complex curved end portion 42 which terminates in an end 43 ordinarily comprising bare copper which is to be tinned for soldering to other half coils when assembled in the machine.

As illustrated ing FIG. 3 of the drawing, the half coil is wrapped with a plurality of layers of mica tape 44— usually 12 to 22 layers of mica tape are employed for the highest voltage applications. In most cases, the complete mica tape wrapping is overlaid with wrapping of glass cloth tape of a thickness of 2 to 5 mils which serves to protect the mica tape from abrasion and abuse. The mica tape of the present invention can be wrapped very tightly about the conductor turns of the half coil. The completed half coil is then placed within a suitable impregnating vessel 46 which contains a relatively low viscosity penetrating siloxane composition 48. The impregnating vessel 46 is placed within an autoclave wherein the half coil 40 is first subjected to vacuum and heating in order to drive off moisture, trapped gases and the like. Thereafter, the vessel 46 is filled with a sufficient quantity of the polysiloxane composition 48 to completely immerse the half coil 40. The vacuum to the autoclave may be broken at this time and atmospheric pressure (or superatmospheric pressure) admitted to force the polysiloxane composition into all of the interstices and voids in the mica tape, as well as any apertures and spaces between the turns of the conductor. After a suitable period of time of the order of an hour, the vessel 46 may be withdrawn from the autoclave and the half coil is lifted therefrom, being permitted to drain briefly. The half coil is then wrapped with the impervious tape, such as polyethylene glycol terephthalate, in order to prevent any excessive drainage of the polysiloxane composition therefrom.

In order that the half coil be formed with a slot portion 41 of the precise size and shape to fit within the slots of the magnetic stator, it is desirable that the half coil be subjected to a hot pressing or molding operation during which the polysiloxane composition will cure to a thermoset solid. It is also desirable that the end turns 42 be consolidated in order to compact the mica tape and to shape the end turns to the precise configuration desired for best joining of the ends 43 of successive half coils to each other.

A suitable device for molding the half coils to a shape, size and configuration while curing the polysiloxane composition is illustrated in FIG. 4 of the drawing. The coil 40 is placed within the corner of a steel channel 50 of a length corresponding to the length of the slot portion 41. A second steel channel 52 is applied to the upper face and other side of the half coil. The channel 52 has a height and width corresponding very closely to the desired thickness and depth of the slot portion. A plurality of C-clamps 54 are disposed about the channel 50. Each C-clamp is provided with a block 56 abutting the corner of the channel 52 and actuated by the screw 58 so that upon adjustment of the screw 58, the block 56 will force channel 52 against channel 50 to compact the slot portion 41 of the coil to suitable size and shape. The end turn 42 is positioned against rigid plates 60 carrying wedges 62 of suitable shape to properly form the desired configuration of the end turn, the end turns being tied thereto by the tapes 66. In addition, rubber pads 64 having a flat face 63 and a rounded upper surface 65 are applied to both of the flat sides of the end turns and tightly wrapped thereagainst by the tape wrapping 66. The assembly of FIG. 4 is then subjected to heating, for example, in an over for a sufficient period of time to fully cure the applied polysiloxane resin composition.

While the polysiloxane compositions of Formulation 1 may be and have been employed for impregnating electrical coils, they cure into hard and relatively brittle resinous solids. More flexible and tougher solids are obtained if the low viscosity polysiloxane compositions of Formulation 1 are admixed with more viscous, long chain polysiloxane liquids having reactive $>C=C<$ groups, such as vinyl, allyl and methallyl, attached to silicon by carbon-silicon bonds. The mixed polysiloxane compositions comprise at least 10% by weight of the polysiloxane of Formulation 1, of a viscosity of less than one poise, and preferably below 50 centipoises, at 25° C., and the balance, at least 10% by weight being the long chain polysiloxane having $>C=C<$ groups, and of a viscosity of above 1 poise, and preferably above 10 poises, at 25° C. Thus, mixtures of equal parts of a polysiloxane of Formulation 3, where $n=2.5$, and the polysiloxane of Example I after neutralizing of the alkali but prior to heating at 150° C. to 200° C., which had a viscosity of 13 poises, produced a mixture of a viscosity of 0.5 poise. The 6 poise polysiloxane oil of Example II may be admixed with the 20 centipoise polysiloxane of Formulation 3, $n=3$, in proportions ranging from 30% to 70% of the former, to produce low viscosity conjoint impregnating fluids of a viscosity of less than 4 poises at 25° C. All of these admixed polysiloxane compositions when cured produced tough solid resinous bodies of excellent strength.

The fluid polysiloxane compositions of a viscosity of less than 4 poises employed for impregnating the taped coil readily penetrate between the turns of the mica wrapping. It has been found that they are effective in penetrating between the mica flakes and the like because of their compatibility with the highly viscous polysiloxane binder applied to the mica tape, and they partially or completely dissolve the binder in their passage whereby the polysiloxane binder does not hinder penetration. In fact, the polysiloxane binder appears to create a path between the mica flakes that facilitates passage and penetration of the low viscosity impregnating polysiloxane composition. In this way, many layers of mica tape are readily penetrated by the impregnating polysiloxane composition which proceeds to fill completely all of the pores, crevices, spaces and the like in the applied insulation 44. Tests of the coils may by applying increasing voltages show only slight increases of power factor with increase in voltage and with increase in temperature. This indicates a substantial absence of voids in the insulation. The following example illustrates the preparation of half coils in accordance with the present invention.

*Example III*

A half coil was taped with 12 layers of the mica tape of Example I. Thereafter, the mica wrapping was covered with half-lapped 5 mil thick glass tape. The resulting coil was subjected to evacuation at a pressure of less than 5 millimeters of mercury after having been heated to a temperature of over 125° C. for 8 hours and cooled to approximately 50° C. It was then impregnated in a tank such as shown in FIG. 3 of the drawing, with the following polysiloxane composition. The polysiloxane was prepared by admixing 70% of the polysiloxane corresponding to Formulation 3 wherein $n$ had an average value of 2.5, and 30% by weight of the composition comprising a methylphenylvinylpolysiloxane which may be prepared in accordance with Example I, having the following configuration:

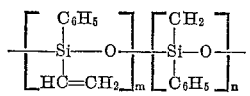

where $m$ and $n$ represent numbers over 10. This last polysiloxane had a viscosity of 13 poises at 25° C. The resulting mixed polysiloxane composition, however, had a viscosity of 0.4 poise at 25° C. An amount equal to 1% by weight of ditertbutyl peroxide was added as a catalyst. The impregnation was carried out by evacuating the coil to below 5 millimeters of mercury, flooding it with the polysiloxane mixture and then applying atmospheric pressure to the surface of the polysiloxane to force it into the interstices of the half coil. Approximately 4 liters of the polysiloxane mixture was required to impregnate the half coil. Thereafter, the half coil was withdrawn from the impregnating tank, permitted to drain briefly and it was then wrapped with a tape of polyethylene glycol terephthalate 1½ inches wide and of a thickness of approximately 1 mil. The half coil was then placed in a molding jig such as shown in FIG. 4 of the drawing. The coil was then subjected to heating for 16 hours at temperatures of 140° C. to 160° C. At the end of this time, the coil was removed from the jig and the rubber padding 64 and tape 63 were unwrapped and the polyethylene glycol terephthalate impervious tape was removed.

The cured resin in the coil was tough and hard. The breakdown strength of the applied insulation on the coil was tested using the one minute, step-by-step breakdown strength test. The insulation had a wall thickness of 3/16 inch and withstood 80 kilovolts. The dielectric strength was between 400 and 500 volts per mil thickness of insulation.

The fluid polysiloxane compositions of the present invention can be employed for potting applications as illustrated in FIG. 5 of the drawing. The container 100 is provided with a support 102 on which are disposed the coils 104 and magnetic core 106. The coils 104 are covered with fibrous wrapping 108, for example, asbestos tape. Leads 110 from the coils pass through the cover 112 of the container through insulating grommets or bushings 114. The cover is provided with a cap screw closure 116.

Completely reactive polysiloxanes of the present invention, with or without finely divided fillers such as silica, calcium carbonate, mica powder, glass and the like, may be introduced through the opening in the cover produced upon removal of the cap screw closure 116. The polysiloxane compositions introduced into the casing 100 may be applied without the use of vacuum, though for best impregnation results the casing 100 should be evacuated previous to introducing the polysiloxane composition. After the polysiloxane composition has been introduced to fill the casing 100 up to the cover 112, the screw closure 116 may be applied to hermetically seal off the casing. Thereafter, the applied polysiloxane composition 118 within the casing is cured by heating the entire casing to a temperature of the order of 150 to 160° C. Very little shrinkage of the polysiloxane composition will be evidenced, being usually about 4% and considerably less if a substantial amount of solid fillers are present.

Numerous types of insulated conductors may be prepared by applying thereto the liquid polysiloxane compositions of the present invention. Thus, full coils, hairpin coils and ordinary bobbin or field coils may be prepared by winding conductors into predetermined shape, usually with a solid insulating material being wrapped about the conductors, and then impregnating or otherwise treating the coil by immersing it in the polysiloxane compositions either with or without vacuum. Thereafter, the polysiloxane compositions applied to the coils may be cured by applying heat thereto in the presence of a polymerization catalyst.

The polysiloxane compositions of the present invention are particularly suitable for preparing electrical bushings therefrom. The bushings comprise an insulating porcelain sleeve disposed about a conductor bushing stud of a length greater than that of the sleeve, whereby the conductor stud projects beyond both ends of the sleeve. a space of substantial size is present between the porcelain sleeve and the conductor stud. This space is filled by applying a plurality of layers of mica tape to that portion of the bushing stud to be disposed within the confines of the sleeve. It has been found desirable to apply a sufficient thickness of mica tape or mica wrapping to the bushing to practically fill the space between the bushing and the sleeve. Thereafter, the bushing disposed within the sleeve is impregnated or filled with the completely reactive polysiloxane compositions of the present invention, preferably under vacuum and cured. Subsequently, the space between the porcelain sleeve and the bushing is filled with solid polysiloxane resin impregnating the mica tape. Outstanding bushings are so produced.

For an illustration of a process for preparing a bushing, reference should be had to FIG. 6 of the drawing showing an impregnating tank 150 provided with a suitable pipe 152 for introducing and withdrawing polysiloxane composition from the tank. The tank comprises a sealable cover 154 and is fitted with a pipe 156 suitable for evacuating the interior of the tank and for introducing air or gases at atmospheric or higher pressure if desired. A stand 158 within the tank supports a bushing 160 which comprises a porcelain sleeve 16 within which is disposed a conductor stud 164. The lower end of the stud 166 extends below a collar 168 fastened thereto and upon which collar the porcelain sleeve 162 rests. The space 170 between the bushing 164 and the porcelain sleeve 162 is partly filled with the mica tape wrapping 172 previously applied thereto. The mica wrapping comprises the mica tape and a viscous polysiloxane binder composition with a viscosity of 100 to 25,000 poises. The exterior surfaces of the bushing have been coated with a suitable protective material 174 to prevent adhesion of any of the compositions thereto, and to enable ready stripping thereof. A suitable material for the coating 174 is polyvinyl alcohol. As illustrated the bushing 160 is covered by low viscosity polysiloxane composition 176 which is at a high enough level that the space 170 is filled. The impregnating polysiloxane composition may consist entirely of the low viscosity polysiloxane of Formula 1, 2 or 3, since a bushing is relatively fixed and is not subject to flexing as may be applied to a conductor, or the impregnating polysiloxane may comprise any of the mixed polysiloxanes disclosed herein. The polysiloxane is applied by vacuum impregnation and it will penetrate into the tape wrapping 172 and will fill the space 170 that exists between the tape and the walls of the bushing. After the impregnation, the bushing is withdrawn from the impregnating tank 150 and then cured by heating, for example, at 150° C. for a period of time to cure the applied polysiloxane impregnant and the tape binder which has been dissolved and admixed therewith. Thereby there is produced a solid polysiloxane resin filling within the space 170. Subsequently, the polyvinyl alcohol may be stripped and another collar may be threadedly attached to the threaded portion 180 at the upper end of the bushing to affix firmly the conductor stud to the porcelain. Such bushings will function satisfactorily at elevated temperatures for prolonged periods of time with satisfactory results.

In some cases, the bushings are prepared by wrapping up to 25 layers of the composite mica tape of Example I on the portion of the conductor stud which will be disposed in the porcelain sleeve. The mica tape wrapping is impregnated with the polysiloxane composition having a viscosity of below 40 centipoises at 25° C. The impregnated mica wrapped stud is covered with an impervious film and cured by heating at 150–160° C. for several hours. More mica tape may be applied, 25 layers at a time, one or more additional times, with curing between each application, until the required thickness of impregnated mica insulation has been put on the bushing. Usually this is a little more than the space in the porcelain sleeve will admit, however it can be readily machined down to let the insulated stud enter the porcelain sleeve. Any space remaining in the sleeve can be filled with the polysiloxane which is cured to a solid resin filling.

It will be understood that the detailed description and drawing are exemplary and not limiting.

We claim as our invention:

1. In the process of preparing an insulated electrical conductor, the steps comprising applying to an electrical conductor composite insulation comprising mica flakes united with a viscous liquid polysiloxane binder of a viscosity of from 100 to 100,000 poises at 25° C., the polysiloxane in the binder comprising reactive >C=C< groups bonded directly to silicon with C-Si linkages, impregnating the conductor and the applied composite insulation with a completely polymerizable fluid polysiloxane composition of a viscosity of not in excess of 4 poises at 25° C., the completely polymerizable polysiloxane comprising at least 10% by weight of a low viscosity, reactive fluid polysiloxane having the formula

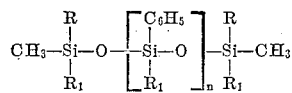

wherein R represents at least one monovalent radical selected from the group consisting of alkyl radicals having not more than four carbon atoms and phenyl, tolyl and xylyl radicals, $R_1$ represents at least one monovalent radical selected from the group consisting of methyl and vinyl groups, there being an average of at least two vinyl groups in each molecule, and $n$ is at least two, and has an average value of from 2.0 to 10, the completely polymerizable fluid polysiloxane impregnant being compatible and mixing with the liquid polysiloxane binder, and curing the polysiloxanes to a thermoset solid.

2. In the process of preparing an insulated electrical conductor, the steps comprising applying to an electrical conductor composite insulation comprising mica flakes united with a viscous liquid polysiloxane binder of a viscosity of from 100 to 100,000 poises at 25° C., the polysiloxane in the binder comprising reactive >C=C< groups bonded directly to silicon with C-Si linkages, impregnating the conductor and the applied composite insulation with a completely polymerizable fluid polysiloxane composition of a viscosity of not in excess of four poises at 25° C., the completely polymerizable polysiloxane comprising at least 10% by weight of a low viscosity fluid polysiloxane having the formula

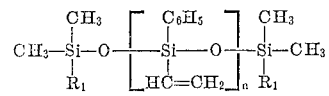

where $R_1$ represents a monovalent radical selected from the group consisting of methyl and vinyl radicals, there being an average of two vinyl groups per molecule, and $n$ is at least two and has an average value of from 2.0 to 10, the completely polymerizable fluid polysiloxane impregnant being compatible and mixing with the liquid polysiloxane binder, and curing the mixed polysiloxanes to a thermoset solid.

3. In the process of preparing an insulated electrical conductor, the steps comprising wrapping an electrical conductor with a composite insulation comprising a sheet backing, mica flakes and a viscous liquid polysiloxane binder of a viscosity of from 100 to 100,000 poises at 25° C., the polysiloxane in the binder comprising reactive >C=C< groups bonded directly to silicon by C-Si linkages, vacuum impregnating the wrapped conductor with a completely polymerizable fluid polysiloxane composition of a viscosity of not in excess of 1 poise at 25° C., the completely polymerizable polysiloxane comprising a mixture of (a) at least 10% by weight of a low viscosity fluid polysiloxane having the formula

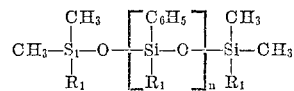

where $R_1$ represents a monovalent radical selected from the group consisting of methyl and vinyl radicals, there being an average of at least two vinyl groups per molecule, and $n$ is at least two and has an average value of from 2 to 10, said (a) siloxane having a viscosity of less than 1.0 poise, and the balance, comprising at least 10% of the weight of the mixture, being (b) at least one compatible hydrocarbon substituted siloxane having about 2 hydrocarbon groups per silicon atom attached to silicon by C to Si bonds and having a viscosity of substantially more than 1 poise, the said (b) siloxane having at least one ethylenic group per molecule attached directly to silicon by a C to Si bond, said ethylenic group being selected from the group consisting of vinyl, allyl, and methallyl radicals and at least 50 percent of the radicals directly attached to silicon, other than oxygen and residual hydroxyl groups directly attached to silicon, consisting of at least one radical selected from the group consisting of methyl and phenyl radicals, the mixture of polysiloxanes being compatible with the viscous liquid polysiloxane binder in the composite insulation, wrapping the exterior of the impregnated coil with a covering of a material relatively impervious to the liquid polysiloxane, and curing the applied polysiloxanes into a solid resin.

4. In the process of preparing an insulated electrical conductor, the steps comprising wrapping an electrical conductor with a composite insulation comprising a sheet backing of glass fibers, mica flakes on the backing and a viscous liquid polysiloxane binder of a viscosity of from 100 to 100,000 poises at 25° C., the polysiloxane in the binder comprising reactive >C=C< groups bonded directly to silicon by C-Si linkages, applying glass tape wrapping about the composite insulation, vacuum impregnating the wrapped conductor with a completely polymerizable fluid polysiloxane composition of a viscosity of not in excess of 1 poise at 25° C., the completely polymerizable polysiloxane comprising a mixture of (a) at least 10% by weight of a low viscosity fluid polysiloxane having the formula

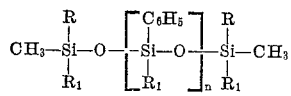

where R represents a monovalent radical selected from the group consisting of alkyl radicals having not more than four carbon atoms and phenyl, tolyl and xylyl radicals and $R_1$ represents a monovalent radical selected from the group consisting of methyl and vinyl radicals, there being an average of at least two vinyl groups per molecule, and $n$ is at least two and has an average value of from 2 to 5, said (a) siloxane having a viscosity of not more than 0.5 poise, and the balance, comprising at least 10% of the weight of the mixture, being (b) at least one compatible hydrocarbon substituted siloxane having about 2 hydrocarbon groups per silicon atom attached to silicon by C to Si bonds and having a viscosity of substantially more than 1 poise, the said (b) siloxane having at least one ethylenic group per molecule attached directly to silicon by a C to Si bond, said ethylenic group being selected from the group consisting of vinyl, allyl, and methallyl radicals and at least 50 percent of the radicals directly attached to silicon, other than oxygen and residual hydroxyl groups directly attached to silicon, consisting of at least one radical selected from the group consisting of methyl and phenyl radicals, the mixture of polysiloxanes being compatible with the viscous liquid polysiloxane binder in the composite insulation, wrapping the exterior of the impregnated coil with a covering of a material relatively impervious to the liquid polysiloxane, molding the wrapped impregnated conductor under heat and pressure to polymerize the polysiloxanes and to shape the conductor.

5. In the method of preparing a bushing comprising a porcelain sleeve and a bushing conductor passing therethrough, the steps comprising wrapping the bushing conductor with a mica tape comprising a sheet backing, mica flakes and a viscous liquid polysiloxane binder of a viscosity of from 100 to 25,000 poises at 25° C., the polysiloxane in the binder comprising reactive >C=C< groups bonded directly to silicon by C-Si linkages, the tape being applied to the portion of the bushing conductor to be disposed in the porcelain sleeve, the mica tape wrapping being sufficient to substantially fill the space between the bushing conductor and the porcelain, impregnating the wrapped bushing conductor with a low viscosity, reactive fluid polysiloxane having the formula

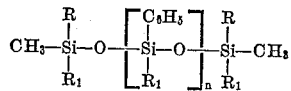

wherein R represents at least one monovalent radical selected from the group consisting of alkyl radicals having not more than four carbon atoms and phenyl, tolyl and xylyl radicals, $R_1$ represents at least one monovalent radical selected from the group consisting of methyl and vinyl groups per molecule, and $n$ is at least two, and has an average value of from 2.0 to 5, and heating the applied polysiloxanes to cure them to a solid resin.

6. In the method of preparing a bushing comprising a porcelain sleeve and a bushing conductor passing therethrough, the steps comprising wrapping the bushing conductor with a mica type comprising a sheet backing, mica flakes and a viscous liquid polysiloxane binder of a viscosity of from 100 to 25,000 poises at 25° C., the polysiloxane in the binder comprising reactive >C=C< groups bonded directly to silicon by C-Si linkages, the tape being applied to the portion of the bushing conductor to be disposed in the porcelain sleeve, the mica tape wrapping being sufficient to substantially fill the space between the bushing conductor and the porcelain sleeve, impregnating the tape wrapping with a polysiloxane composition comprising a mixture of (a) at least 10% by weight of a low viscosity fluid polysiloxane having the formula

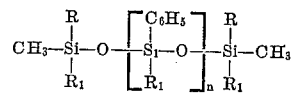

where R represents a monovalent radical selected from the group consisting of alkyl radicals having not more than four carbon atoms, and phenyl, tolyl and xylyl radicals and $R_1$ represents a monovalent radical selected from the group consisting of methyl and vinyl radicals, there being an average of at least two vinyl groups per molecule, and $n$ is at least two and has an average value of from 2 to 5, said (a) siloxane having a viscosity of not more than 0.5 poise, and the balance, comprising at least 10% of the weight of the mixture, being (b) at least one compatible hydrocarbon substituted polysiloxane having about 2 hydrocarbon groups per silicon atom attached to silicon by C to Si bonds and having a viscosity of substantially more than 1 poise, the said (b) polysiloxane having at least one ethylenic group per molecule attached directly to silicon by a C to Si bond, said ethylenic group being selected from the group consisting of vinyl, allyl, and methylallyl radicals and at least 50 percent of the radicals directly attached to silicon, other than oxygen and residual hydroxyl groups directly attached to silicon, consisting of at least one radical selected from the group consisting of methyl and phenyl radicals, the mixture having a viscosity of the order of from 40 centipoises to 10 poises.

References Cited in the file of this patent

UNITED STATES PATENTS

| | | |
|---|---|---|
| 2,258,222 | Rochow | Oct. 7, 1941 |
| 2,480,822 | Hyde | Sept. 6, 1949 |
| 2,595,729 | Swiss et al. | May 6, 1952 |
| 2,604,487 | Burkhard | July 22, 1952 |
| 2,656,290 | Berberich et al. | Oct. 20, 1953 |
| 2,669,601 | Johnson et al. | Feb. 16, 1954 |
| 2,714,099 | Weyenberg | July 26, 1955 |